Jan. 15, 1952   A. R. MAHLIG ET AL   2,582,445
SPRAYER
Filed Aug. 5, 1946   3 Sheets-Sheet 3
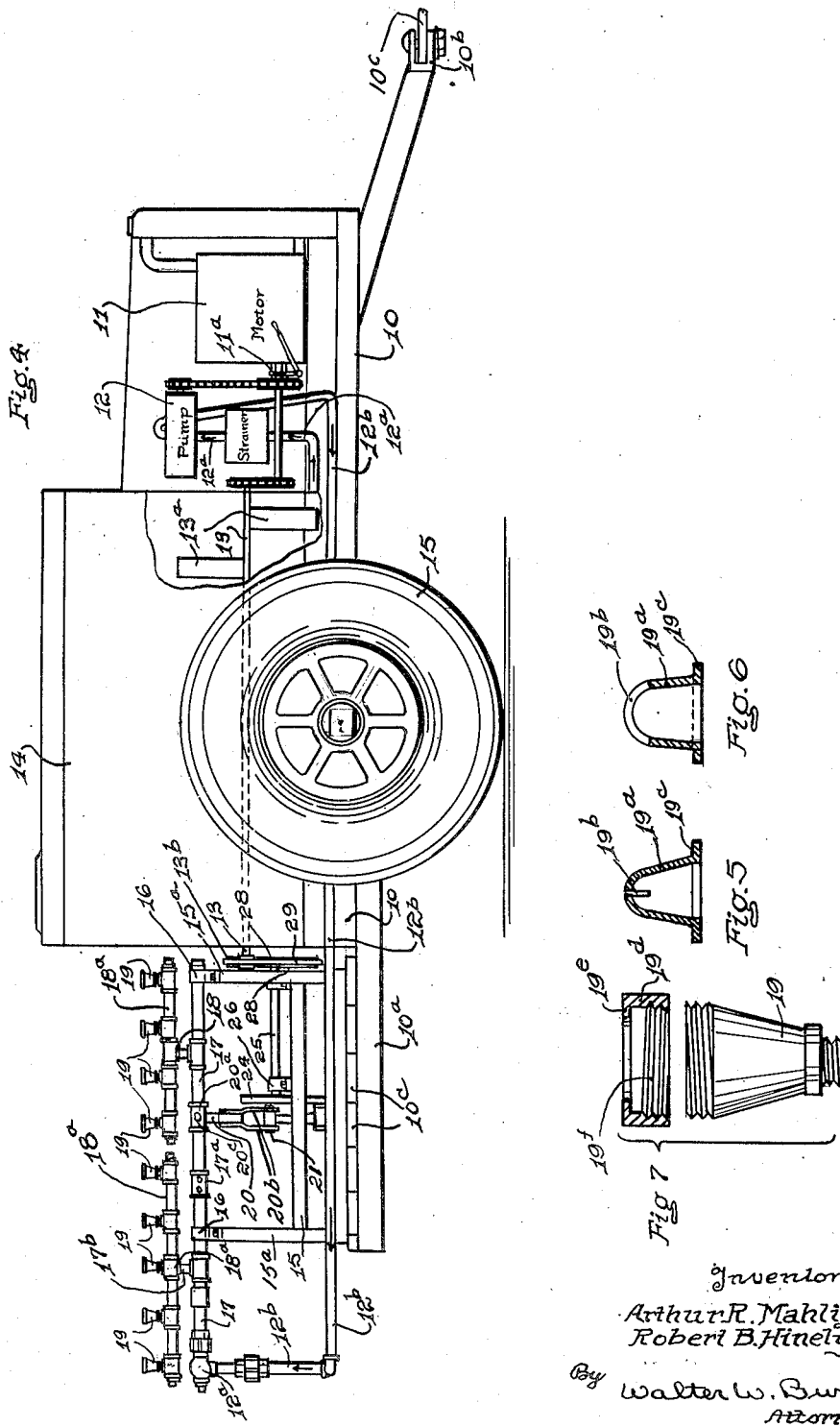
Inventors
Arthur R. Mahlig
Robert B. Hinely
By Walter W. Burns
Attorney Patented Jan. 15, 1952

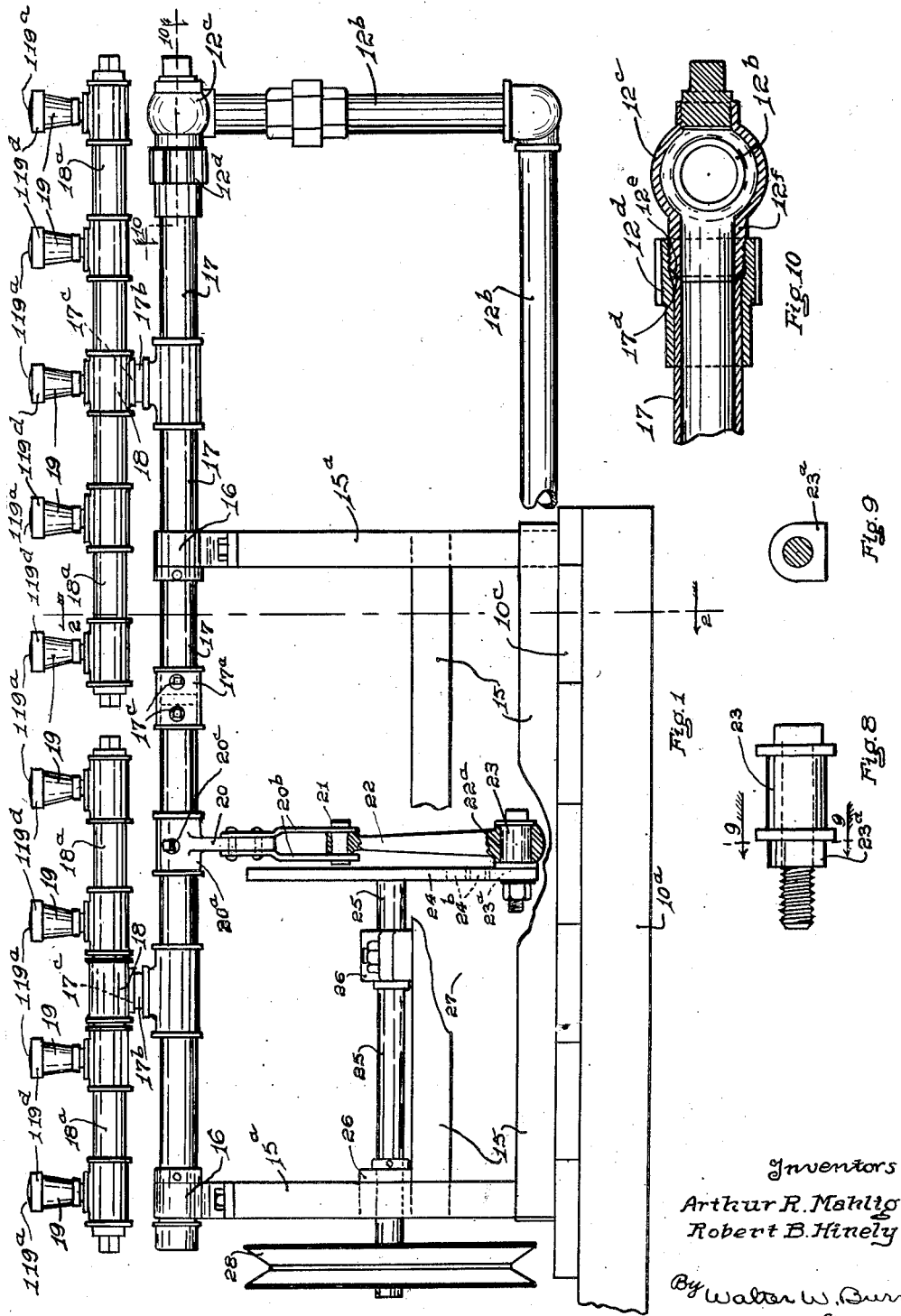

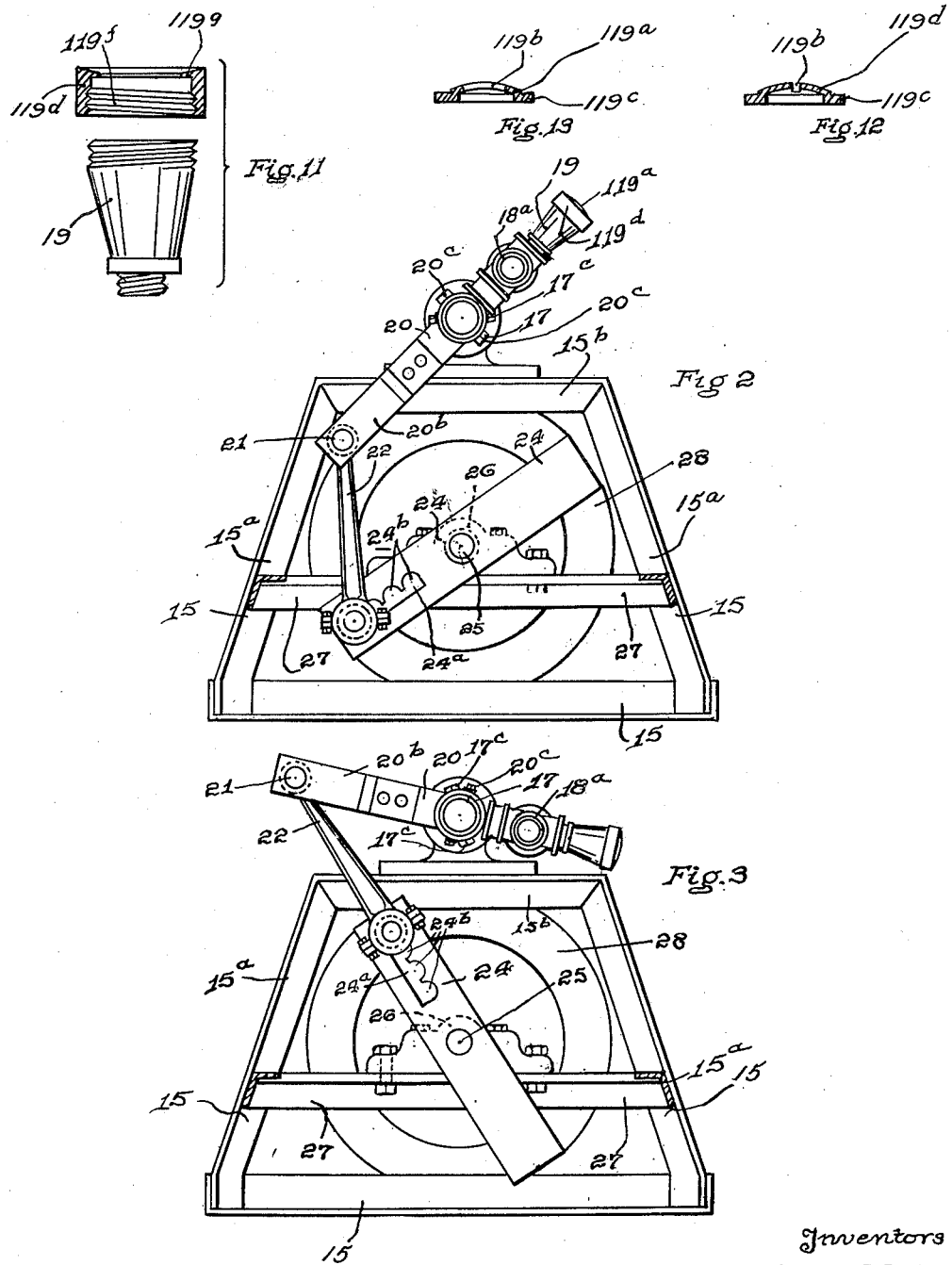

2,582,445

UNITED STATES PATENT OFFICE 2,582,445

SPRAYER

Arthur R. Mahlig and Robert B. Hinely, Orlando, Fla.

Application August 5, 1946, Serial No. 688,460

3 Claims. (Cl. 299—37)

This invention relates to sprayers and particularly to those sprayers used in agriculture, horticulture and orchard culture.

In treating growing plants and trees with sprayers, one of the greatest problems is to spread the solution over the surfaces of the plant in a uniform manner so that all surfaces where fungus or parasites may be, will be completely covered. While it is possible to do this with a hand spray, the use of such devices usually results in either a deficient amount of spray reaching some of the plant surfaces or an excess of liquid from the spray on other plant surfaces. Sometimes both conditions are present in the same area. In the case of an insufficient spray, the plant surfaces do not get full treatment and when an excess amount of spray is delivered, there is a wastage of the material in the spray.

In addition, the use of a hand controlled spray involves the labor of one or more men to direct the nozzle or nozzles.

The primary object of this invention is the provision of an improved power spray mechanism.

Another object of the invention is the provision of a sprayer which will deliver a definite and predetermined amount of spray over a given area under the same conditions of atmosphere.

Another object of the invention is the provision of a sprayer having an oscillating spraying means to deliver spray at higher or lower levels as desired. A still further object of the invention is the provision of a sprayer having a plurality of spraying means relatively adjustable to each other to meet varying conditions of the subjects to be treated and the varying conditions of atmosphere.

Still another object of the invention is the provision of a sprayer having an oscillating spraying means with provision for varying the amount of oscillation by varying the angle of oscillation.

Another and still further object of the invention is the provision of a sprayer wherein there is a plurality of spraying nozzles with means for oscillating the nozzle a predetermined angle or angles, with means for changing the average delivery angle and having means for varying the angle of the individual nozzles relative to the plane perpendicular to the axis of oscillation.

Referring to the drawing wherein is illustrated an embodiment of the invention,

Fig. 1 is a side view of the working portion of the invention with the parts arranged for delivery at the right side of the machine.

Fig. 2 is a sectional view taken on the line 2—2 of Fig. 1.

Fig. 3 is a view similar to Fig. 2 but with the nozzles in their lowest positions.

Fig. 4 is a side view of the invention attached to the necessary power means, pump and tank and shown as mounted on a trailer.

Figs. 5, 6 and 7 are detailed views of the nozzle and its retaining collar.

Fig. 8 is an enlarged view of the means for pivotally connecting the plate 24 and the connecting rod 22.

Fig. 9 is a cross-section on the line 9—9 of Fig. 8.

Fig. 10 is a detail cross section on the line 10—10 of Fig. 1.

Fig. 11 is a separated view of the nozzle parts, the outer section being in cross section.

Figs. 12 and 13 are sectional views taken at right angles to each other of the nozzle plate 119a in different positions.

Similar reference characters refer to the same or similar parts throughout the specification and drawing.

In the drawing, the invention is illustrated as being mounted on a two-wheel trailer but it is obvious that it may be carried on a truck or any other suitable vehicle.

The numeral 10 designates the trailer frame having rear extensions 10a upon which the working portion of the invention is mounted. On the forward portion of the frame 10 is mounted a power unit as the internal combustion motor 11. The motor 11 drives a pump 12 and is also operatively connected to an agitator shaft 13, which extends through the tank 14 which carries the liquid for the spray supply. The agitator shaft 13 is provided with siutable agitators 13a which maintain a state of agitation in the liquid within the tank 14.

The ground wheels 15 support the frame 10 and the equipment carried thereby. A suitable connecting hitch 10b is provided for connection to the draw bar 10d of a tractor, truck or other draft means.

Mounted on platform 10c which is supported by the extension frame 10a, is a sprayer frame 15 having uprights 15a and cross top beams 15b. Mounted on the cross top pieces 15b are bearings 16 in which are journaled a hollow sectional conduit member 17. This conduit member 17 receives and distributes the liquid from the tank 14 as will be described.

A coupling 17a connects the sections of the conduit member 17 together and is so constructed that when the set screws 17x are tightened, the sections will be held in relatively rigid position.

Extending from each section of the conduit member 17 is a branch conduit member 17b which carries, at its end, a screw thread 17c on which is threaded a header connection 18. Extending from this header connection are distribution pipes 18a. On each distribution pipe 18a is mounted one or more nozzles for the delivery of the spray to the air.

These nozzles have an adjustable end 19a having a slit 19b. The inner portion of the adjustable end 19a has a rim 19c which engages the outer edge of the threaded portion 17c of the branch conduit member 17b. It is to be noted that the clamping collar 19d has a flange 19e which, when in place, rests on the flange 19c. The threaded inner surface 19f registers with the threaded surface 19g of the nozzle 19 to securely hold the adjustable end 19a in place. By placing the adjustable end 19a at various angles, the form of the spray, as it emerges, may be varied. The general shape of the spray is that of a flattened cone, the cross-section of which is substantially elliptical. By placing the adjustable end 19a in various positions, the positions of the long and short axes of the spray cross section may be varied, thus varying the effect of the spray, as desired by the operative.

In Figs. 11, 12 and 13, another form of nozzle is illustrated. An adjustable end 119a is provided with a slot 119b and a flange 119c. A retaining collar 119a is provided with a flange 119e and a threaded portion 119f. The parts 119a, 119b, 119c, 119d, 119e and 119f are counterparts of the corresponding parts 19a, 19b, 19c, 19d, 19e and 19f of Figs. 7, 8 and 9 and either may be made in any size and proportion found to be convenient. These parts are assembled on the body 19 of the nozzle shown in section on Fig. 1 and at the angle desired to produce the results. As the details of the nozzle per se are not a part of this invention, they will not be further discussed.

By adjusting the headers 18 about their axes, it is clear that varying nozzle effects may be obtained.

As has already been indicated the conduit members 17 oscillate in bearings 16. To bring about this oscillation, there is provided a mechanism which will now be described.

Secured to the conduit member 17 at any suitable place is a bell crank arm 20 having a sleeve end 20a which surrounds the conduit member 17. Extending from and secured to the bell crank 20 are two arms 20b for a purpose to be presently described. A set screw 20c is provided for securing the relative adjustment between the arm 20 and the conduit 17.

The outer ends of the arms 20b are provided with openings to receive the pin 21 which carries the upper end of the connecting rod 22. The connecting rod 22 has a lower bearing 22a which is journalled on a crank pin 23. This crank pin 23 is adjustably mounted on the crank plate 24 which is mounted to rotate on and with the power shaft 25. The crank plate 24 is provided with a slot 24a having notches 24b on one side. On one end of the crank pin 23 is a block member 23a so shaped as to engage one side of the slot 24a and one of the notches 24b.

By adjusting the block member 23a to different positions—toward or from the center of the rotating shaft axis—it is obvious that the rotation of the shaft 25 will cause a less or greater oscillation of the conduits 17—according to its position in the slot 24a.

The shaft 25 is suitably journalled in bearings 26 which are supported by and on the transverse supporting members 27. On the forward end of the shaft 25 is a drive pulley 28 which drives the shaft 25 to oscillate the conduit 17 and the nozzles carried thereby.

The shaft 13, which is driven by the internal combustion motor or other power means 11, has a pulley 13b which is connected to the pulley 28 by a belt 29.

The pump 12 is connected to an inlet pipe and an outlet pipe. The inlet pipe 12a connects with the interior of the tank 14. The outlet pipe 12b extends rearwardly and is connected to the conduit 17 by a joint 12c which permits the conduit 17 to oscillate relative to the pipe 12b, without leakage. It is to be noted that the threaded sleeve 12d draws upon the flange end of the pipe 17 to hold the latter against a conical surface on the main body of the joint 12c. The flanged end 17d has an internal conical surface to coact with the external conical surface 12e on the end 12f of the joint member 12c.

The operation of the whole assembly will now be described.

After setting the block member 23a to provide the desired angle of oscillation, setting the couplings 17a to predetermine the angles of the branches 17b, relative to each other, setting the set screws 20c at the desired adjustment of the conduit 17 relative to the arm 20, setting the headers 18 at the desired angles of the distributing pipes 18a and lastly, after adjusting the positions of the several adjustable ends 19a of the nozzle, the motor is started.

Being connected to the agitator shaft 13, the agitators 13a stir up the liquid within the tank 14. When all is ready, a suitable clutch 11a is closed to start operation of the pump, permitting the pump 12 to drive the fluid from the tank 14 through the delivery pipe 12b, by which the liquid is delivered to the conduit 17. On reaching the branches 17b, the liquid passes therethrough to the headers 18 and to their distributing pipes 18a which deliver the liquid to the nozzle openings 19b, 119b.

As already pointed out, it is presupposed that the adjustable nozzle ends 19a have been adjusted about their axes, the distributing pipes 18a have been adjusted, the sections of the conduit 17 have been adjusted angularly by the coupling 17a, the adjustment between the arm 20 and the conduit member 17 has been accomplished and the block 23a has been adjusted in the slot 24a all to bring about the desired delivery according to the atmospheric conditions and the line of travel selected for the machine.

The shaft 13 drives the pulley 13b which, in turn, drives the pulley 28 by the belt 29. This rotates the shaft 25 and with it the crank plate 24 and its crank pipe 23a.

If fewer nozzles are required, some may be replaced with closed caps and if only one nozzle is needed per section of conduit 17, each header 18 and branch 17b may be removed and a nozzle put in its place.

It will thus be clear that there has been provided an efficient spray machine which provides for changing conditions or operations whereby the operative may make adjustments and changes to meet the conditions which may be encountered in the field of operation and which may vary from hour to hour as atmospheric conditions change.

While one embodiment of the invention has been illustrated and described in detail, it is to be understood that the disclosure is merely illustrative and that modifications and changes may be made without departing from the spirit of the invention and within its scope as claimed.

Having described our invention, what we claim is:

1. A spraying machine comprising a hollow liquid-carrying shaft, the shaft having sections angularly adjustable with relation to each other, spray-delivering means including a plurality of hollow headers disposed normally parallel with respect to the hollow shaft, means supporting the headers on the shaft and serving as conduits therebetween, said supporting means being adjustable so as to permit angular adjustment of the headers with respect to the shaft, a plurality of nozzles on each of the headers and connected to receive liquid therefrom, supports for oscillatingly supporting the shaft, and power means for oscillating the shaft through a predetermined angle.

2. A spraying machine comprising a hollow liquid-carrying shaft, the shaft having sections angularly adjustable with relation to each other, spray-delivering means including a plurality of hollow headers disposed normally parallel with respect to the hollow shaft, means supporting the headers on the shaft and serving as conduits therebetween, said supporting means being adjustable about an axis normal to the shaft axis so as to permit angular adjustment of the headers with respect to the shaft and each other, a plurality of nozzles on each of the headers and connected to receive liquid therefrom and having substantially parallel axes, supports for oscillatingly supporting the shaft, and power means for oscillating the shaft through a predetermined angle.

3. A spraying machine comprising a hollow liquid-carrying shaft, the shaft having sections angularly adjustable with relation to each other, spray-delivering means including a plurality of hollow headers disposed normally parallel with respect to the hollow shaft, means supporting the headers on the shaft and serving as conduits therebetween, said supporting means being adjustable so as to permit angular adjustment of the headers with respect to the shaft, a plurality of nozzles on each of the headers and connected to receive liquid therefrom, supports for oscillatingly supporting the shaft, power means for oscillating the shaft through a predetermined angle, and an adjustable connection between the power means and shaft for adjusting the header and shaft as a unit, relative to the power means.

ARTHUR R. MAHLIG.
ROBERT B. HINELY.

REFERENCES CITED

The following references are of record in the file of this patent:

UNITED STATES PATENTS

| Number | Name | Date |
|---|---|---|
| 816,604 | Russell | Apr. 3, 1906 |
| 927,837 | Delene | July 13, 1909 |
| 995,811 | Standish | June 20, 1911 |
| 995,931 | Waller | June 20, 1911 |
| 1,454,844 | Campbell | May 15, 1923 |
| 1,580,478 | Fox et al. | Apr. 13, 1926 |
| 2,411,964 | Grass | Dec. 3, 1946 |